(12) United States Patent
Kaltenbach

(10) Patent No.: US 10,071,622 B2
(45) Date of Patent: Sep. 11, 2018

(54) AUTOMATED RANGE-CHANGE TRANSMISSION IN A MOTOR VEHICLE AND METHOD FOR OPERATION OF SAME

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 352 days.

(21) Appl. No.: 14/235,478

(22) PCT Filed: Jun. 14, 2012

(86) PCT No.: PCT/EP2012/061336
§ 371 (c)(1),
(2), (4) Date: Jan. 28, 2014

(87) PCT Pub. No.: WO2013/017326
PCT Pub. Date: Feb. 7, 2013

(65) Prior Publication Data
US 2014/0150604 A1 Jun. 5, 2014

(30) Foreign Application Priority Data

Jul. 29, 2011 (DE) .................. 10 2011 080 069

(51) Int. Cl.
*F16H 37/04* (2006.01)
*B60K 6/20* (2007.10)
(Continued)

(52) U.S. Cl.
CPC ............. *B60K 6/20* (2013.01); *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| | | | |
|---|---|---|---|
| 5,856,709 A | * | 1/1999 | Ibaraki ............... B60K 6/36 180/165 |
| 6,159,127 A | | 12/2000 | Loeffler et al. |

(Continued)

FOREIGN PATENT DOCUMENTS

| | | |
|---|---|---|
| DE | 10 2007 010 829 A1 | 9/2008 |
| DE | 10 2008 000 953 A1 | 10/2009 |
| DE | 10 2008 002 380 A1 | 12/2009 |

OTHER PUBLICATIONS

PCT Search Report, dated Sep. 3, 2012.

*Primary Examiner* — Erin D Bishop
(74) *Attorney, Agent, or Firm* — Dority & Manning, P.A.

(57) ABSTRACT

An automated range-change transmission (CT) of a motor vehicle, has a main transmission (HG) with a lay-shaft design, which features a main shaft (WH) and at least one lay shaft ($W_{VG1}$, $W_{VG2}$), and a pre-shift group (GV) drivingly connected upstream on the main transmission (HG). An input shaft ($W_{GE}$) of the range-change transmission (CT) is able to be coupled with an internal combustion engine (VM) of a drive unit of the motor vehicle. An output shaft ($W_{GA}$) of the range-change transmission (CT) is coupled with an axle drive (AB) of the motor vehicle. An electric motor (EM) of the drive unit is able to be coupled at the pre-shift group (GV) through a planetary transmission (PG), whereas the electric motor (EM) is coupled to a first element of the planetary transmission (PG), a second element of the planetary transmission (PG) is coupled with an input shaft of the pre-shift group (GV), and a third element of the planetary transmission (PG) is coupled with an output shaft of the pre-shift group (GV).

13 Claims, 10 Drawing Sheets

(51) Int. Cl.

| | |
|---|---|
| *B60K 6/365* | (2007.10) |
| *B60K 6/48* | (2007.10) |
| *B60K 6/547* | (2007.10) |
| *F16H 3/12* | (2006.01) |
| *F16H 3/72* | (2006.01) |
| *B60W 10/02* | (2006.01) |
| *B60W 10/06* | (2006.01) |
| *B60W 10/08* | (2006.01) |
| *B60W 10/115* | (2012.01) |
| *B60W 20/00* | (2016.01) |
| *B60W 30/18* | (2012.01) |
| *B60W 20/40* | (2016.01) |
| *F16H 3/095* | (2006.01) |
| *F16H 3/097* | (2006.01) |
| *B60W 20/30* | (2016.01) |

(52) U.S. Cl.
CPC ............ *B60W 10/02* (2013.01); *B60W 10/06* (2013.01); *B60W 10/08* (2013.01); *B60W 10/115* (2013.01); *B60W 20/00* (2013.01); *B60W 20/40* (2013.01); *B60W 30/18027* (2013.01); *B60W 30/18036* (2013.01); *F16H 3/126* (2013.01); *F16H 3/725* (2013.01); *F16H 37/046* (2013.01); *B60K 2006/4816* (2013.01); *B60K 2006/4825* (2013.01); *B60K 2006/4841* (2013.01); *B60W 20/30* (2013.01); *F16H 3/095* (2013.01); *F16H 3/097* (2013.01); *F16H 2200/2005* (2013.01); *Y02T 10/6221* (2013.01); *Y02T 10/6252* (2013.01); *Y02T 10/6286* (2013.01); *Y10S 903/902* (2013.01); *Y10T 74/19014* (2015.01); *Y10T 74/19233* (2015.01)

(56) References Cited

U.S. PATENT DOCUMENTS

| | | | |
|---|---|---|---|
| 6,805,648 | B1 | 10/2004 | Ehrlinger |
| 7,575,529 | B2* | 8/2009 | Holmes .................. B60K 6/365 475/10 |
| 2003/0075133 | A1* | 4/2003 | Ehrlinger ............... B60K 6/365 123/179.22 |
| 2010/0108414 | A1 | 5/2010 | Kaltenbach |
| 2010/0173746 | A1* | 7/2010 | Ideshio .................. B60K 6/365 477/36 |
| 2010/0216584 | A1 | 8/2010 | Lutoslawski |
| 2011/0111910 | A1* | 5/2011 | Ideshio .................. B60K 6/36 475/5 |
| 2012/0031230 | A1 | 2/2012 | Guggolz et al. |
| 2012/0240723 | A1 | 9/2012 | Gluckler et al. |

* cited by examiner

AUTOMATED RANGE-CHANGE TRANSMISSION IN A MOTOR VEHICLE AND METHOD FOR OPERATION OF SAME

FIELD OF THE INVENTION

The invention relates to an automated range-change transmission of a motor vehicle. The invention also relates to a method for the operation of the same.

BACKGROUND

Manual transmissions formed as an automated range-change transmission with a multi-stage main transmission and a post-shift group drivingly connected downstream on the main transmission, particularly designed as a range group, and/or a pre-shift group drivingly connected upstream on the main transmission, particularly designed as a split group, are known from DE 10 2007 010 829 A1 and are used, for example, in commercial vehicles. Through a two-stage-designed split group, for example, with one gear ratio jump corresponding to roughly half of one medium-sized gear ratio jump between two successive gear ratio steps of the main transmission, the gear ratio jumps of the main transmission are halved, and the total number of available gears is doubled. For example, through a two-stage range group with one gear ratio jump lying roughly around one medium-sized gear ratio jump between two successive gear ratio steps of the main transmission over the entire gear ratio jump of the main transmission, the spread of the range-change transmission is roughly doubled, and the total number of available gears is once again doubled. The split group may be upstream or downstream along the main transmission, and therefore may be designed as a pre-shift group or a post-shift group. Likewise, the range group may be upstream or downstream along the main transmission, and therefore may be designed as a pre-shift group or a post-shift group. Automated manual transmissions that have positively working shift elements are distinguishable from automated power shift transmissions with frictionally working shift elements.

The present invention relates to an automated range-change transmission that includes at least one main transmission and one pre-shift group preferably designed as a split group. Optionally, there may be a post-shift group.

With the automated range-change transmission known from the state of the art, the main transmission has a lay-shaft design, and comprises a main shaft and at least one lay shaft. The pre-shift group and the post-shift group (if present) may likewise have a lay-shaft design. If an automated range-change transmission is integrated into a drive train of a motor vehicle, an input shaft of the automated range-change transmission, i.e. the pre-shift group, is preferably connected through a controllable starting clutch to the drive unit, and an output shaft of the automated range-change transmission is connected to an axle drive.

If the drive unit is designed as a pure internal combustion engine, the internal combustion engine is, as already mentioned, preferably coupled through the starting clutch with the input shaft of the range-change transmission.

If the drive unit is designed as a hybrid drive with an internal combustion engine and an electric motor, the electric motor is shifted either under the provision of a so-called "crankshaft starter generator" (KSG arrangement) between the internal combustion engine and the starting clutch, or under the provision of a so-called "integrated starter generator" (ISG arrangement) between the starting clutch and the input shaft of the range-change transmission Electrodynamic drive systems with an electric motor and a planetary transmission are known from each of DE 199 34 696 A1, DE 10 2008 043 341 A1 and EP 0 986 713 B1, whereas, according to EP 0 986 713 B1 and DE 10 2008 043 341 A1, each electrodynamic drive system encompasses or comprises the particular entire transmission.

SUMMARY OF THE INVENTION

On this basis, the present invention is subject to the problem of creating a new automated range-change transmission of a motor vehicle, and a method for the operation of the same. Additional objects and advantages of the invention will be set forth in part in the following description, or may be obvious from the description, or may be learned through practice of the invention.

The objects are solved by an automated range-change transmission according to aspects of the invention.

In accordance with the invention, an electric motor of the drive unit formed as a hybrid drive is able to be coupled to the pre-shift group through a planetary transmission, whereas a second element of the planetary transmission is coupled with an input shaft of the pre-shift group and thus the input shaft of the range-change transmission, and whereas a third element of the planetary transmission is coupled with an output shaft of the pre-shift group and thus the input shaft of the main transmission. Therefore, in accordance with the invention, the electrodynamic drive system does not encompass the entire range-change transmission, but only the pre-shift group.

Due to the fact that the electrodynamic drive system does not encompass the entire transmission, but only the pre-shift group of the range-change transmission, a variety of advantages is able to be realized. Thus, for electrodynamic driving or electrodynamic starting, as the case may be, the gear ratio of the main transmission and a post-shift group (if present) may be used. In addition, for pure electric driving, the gear ratio of the main transmission and a post-shift group (if present) may be used. Another advantage lies in the fact that, for the range-change transmission under the invention, the rotational speed range of the electric motor is close to the rotational speed range of the internal combustion engine, since the pre-shift group has a lower spread than the overall range-change transmission. Another advantage of the range-change transmission under the invention is that an electrodynamic starting or electrodynamic driving, as the case may be, is also possible in reverse. With the range-change transmission under the invention, the main transmission can be synchronized with the assistance of the electric motor. Therefore, a conventional synchronizing device or a transmission brake can be omitted. Moreover, for the range-change transmission under the invention, a start of the internal combustion engine in neutral and a charging of an electrical energy storage device in neutral is possible independent of forward speed.

Preferably, the third element of the planetary transmission, under a bypassing of a shift packet of the pre-shift group, is coupled with the main transmission through an idler mounted coaxially to the input shaft of the pre-shift group and through the lay shaft. In particular, between the third element of the planetary transmission and the lay shaft, one gear ratio step is shifted, the gear ratio of which lies between one gear ratio of a shiftable low gear ratio step of the pre-shift group and one gear ratio of a shiftable high gear ratio step of the pre-shift group. Such an arrangement is especially advantageous in terms of design. If there is an additional gear ratio step, the gear ratio of which lies between the gear ratio of the shiftable low gear ratio step and the shiftable high gear ratio step of the pre-shift group, the differential rotational speed at the planetary transmission for the shifted pre-shift group can be kept low. Thereby, an idle power at the planetary transmission, through which the electric motor engages at the pre-shift group, can be kept low.

Under an advantageous embodiment of the invention, a shift packet is provided, through which the coupling of the second element of the planetary transmission is shiftable with the input shaft of the range-change transmission, or the coupling of the third element of the planetary transmission is shiftable with the output shaft of the pre-shift group, or the coupling of the first element of the planetary transmission is shiftable with the electric motor. Through such a shift packet, additional advantageous operating modes for a motor vehicle are able to be realized with an automated range-change transmission under the invention.

Advantageous methods for the operation of a motor vehicle with an automated range-change transmission, with which the electrodynamic drive system does not comprise the entire transmission but only the pre-shift group, are defined herein. All of such methods allow for an innovative and preferred operation of such a motor vehicle with such an automated range-change transmission.

BRIEF DESCRIPTION OF THE DRAWINGS

Preferred additional forms of the invention arise from the sub-claims and the following description. Embodiments of the invention are, without any limitation, described in more detail through the drawing. Thereby, the following is shown:

DETAILED DESCRIPTION

Figure 1:
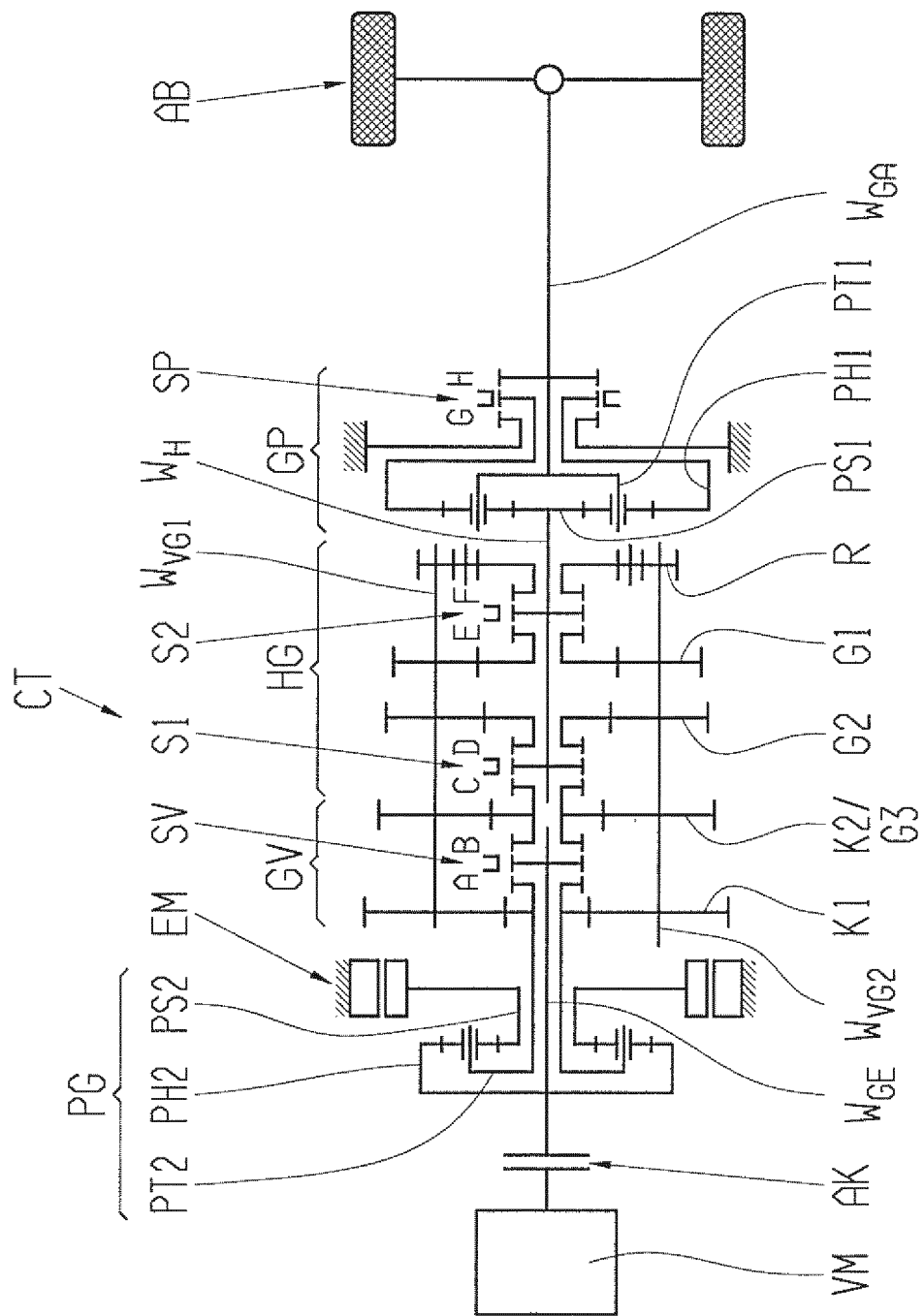
FIG. 1 is a diagram of a drive train with a range-change transmission under the invention along with a drive unit and an axle drive according to a first embodiment of the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a diagram of a range-change transmission CT, together with an internal combustion engine VM of a hybrid drive, an electric motor EM of the hybrid drive and an axle drive AB. The range-change transmission CT represented in FIG. 1 comprises a main transmission HG, a pre-shift group designed as a split group GV drivingly connected upstream on the main transmission HG along with a post-shift group designed as a range group GP drivingly connected downstream on the main transmission HG. The post-shift group GP is optional, and can also be omitted.

The main transmission HG of the range-change transmission CT of FIG. 1 is designed as a direct-drive transmission in a lay-shaft design, and has a main shaft $W_H$ and two lay shafts $W_{VG1}$ and $W_{VG2}$. The main transmission HG is arranged with three stages with three gear ratio steps G1, G2 and G3 for forward travel and one gear ratio step R for reverse travel. Each of the idlers of gear ratio steps G1, G2 and R is rotatably mounted on the main shaft $W_H$, and is shiftable through associated claw couplings. The associated fixed gears are arranged non-rotatably on the lay shafts $W_{VG1}$ and $W_{VG2}$.

Each of the shift clutches of gear ratio steps G3 and G2 and the shift clutches of gear ratio steps G1 and R is formed as a claw coupling and grouped into one common shift packet S1 or S2, as the case may be, with the shift elements C and D in the shift packet S1 and the shift elements E and F in the shift packet S2.

The pre-shift group of the range-change transmission CT of FIG. 1, designed as a split group GV, is formed in two stages, and likewise has a lay-shaft design, whereas the two gear ratio steps K1 and K2 of the pre-shift group GV form two shiftable input constants of the main transmission HG. Due to a lower gear ratio difference of the two gear ratio steps K1, K2, the pre-shift group GV is disengaged as a split group.

The idler of the first gear ratio step is rotatably mounted on the input shaft $W_{GE}$, which is connected to the internal combustion engine VM of the hybrid drive through a controllable starting clutch AK. The idler of the second gear ratio step K2 is rotatably mounted on the main shaft WH, whereas the second gear ratio step K2 of the pre-shift group GV and the gear ratio step G3 of the main transmission HG are grouped into the structure. Each of the fixed gears of the two gear ratio steps K1 and K2 of the pre-shift group or the split group GV, as the case may be, is arranged non-rotatably with the lay shafts $W_{VG1}$ and $W_{VG2}$ of the main transmission HG, which are extended on the input side. The synchronized shift clutches, formed as claw couplings, of the pre-shift group GV are grouped into a common shift packet SV with the shift elements A and B.

The optional post-shift group of the range-change transmission CT of FIG. 1, downstream on the main transmission and designed as range group GP, is likewise formed in two stages, but in a planetary design with one simple planetary transmission. The sun gear PS1 is connected non-rotatably to the main shaft $W_H$ of the main transmission HG, which is extended on the output side. The planetary carrier PT1 is coupled non-rotatably with the output shaft $W_{GA}$ of the range-change transmission CT, which is connected to the axle drive AB, which is marked off by dashes. The ring gear PH1 is connected to one shift packet SP with two synchronized shift elements G and H, formed as claw couplings, through which the range group GP is shiftable alternatively through the connection of the ring gear PH1 with a fixed housing component in a slow speed stage, or through the connection of the ring gear PH1 with the main shaft $W_H$ or the sun gear PS1, as the case may be, into a rapid speed stage.

With the automated range-change transmission CT under the invention, an electric motor EM of the drive unit formed as a hybrid, which also includes the internal combustion engine VM, is able to be coupled to the pre-shift group GV through a planetary transmission PG, whereas the electric motor EM is able to be coupled to the first element of the planetary transmission PG, whereas a second element of the planetary transmission PG is able to be coupled with an input shaft of the pre-shift group GV and thus the input shaft $W_{GE}$ of the range-change transmission CT, and whereas a third element of the planetary transmission PG is able to be coupled with an output shaft of the pre-shift group GV and thus an input shaft of the main transmission HG.

The input shaft of the pre-shift group GV corresponds to the input shaft $W_{GE}$ of the range-change transmission CT. The output shaft of the pre-shift group GV corresponds to the input shaft of the main transmission HG, in the shown embodiment the two lay shafts $W_{VG1}$, $W_{VG2}$.

Preferably, the third element of the planetary transmission PG, under the bypassing of the shift packet SV of the pre-shift group GV, is coupled with the or each lay shaft $W_{VG1}$, $W_{VG2}$ and thus with the main transmission HG through an idler mounted coaxially to the input shaft of the pre-shift group GV, namely through the fixed gear combing in this idler, which is allocated to the particular lay shaft $W_{VG1}$, $W_{VG2}$, whereas this idler and fixed gear in FIG. 1 together form the gear ratio step K1 of the pre-shift group GV.

If the shift element A of the shift packet SV of the pre-shift group GV is closed, the low gear ratio step of the pre-shift group GV is shifted, whereas if the shift element B of this shift packet SV is shifted, the high gear ratio step of the pre-shift group GV is shifted. At this point, it should be noted that, with so-called "overdrive design" of the range-change transmission CT, the shift element B of the shift packet SV is shifted in the low gear ratio step, and the shift element A of the shift packet SV is shifted in the high gear ratio step of the pre-shift group GV.

In the preferred embodiment shown in FIG. 1, the electric motor EM is able to be coupled to the sun gear PS2 of the planetary transmission PG, the input shaft of the pre-shift group GV (and thus the input shaft $W_{GE}$ of the range-change transmission CT) is coupled with a ring gear PH2 of the planetary transmission PG. The output shaft of the pre-shift group GV (and thus the input shaft of the main transmission HG) is coupled with a bar (also referred to as a "planetary carrier") PT2 of the planetary transmission PG.

The above three elements of the planetary transmission PG, namely the sun gear PS2, the ring gear PH2 and the bar PT2, may be coupled in other ways with these shafts of the pre-shift group GV and the electric motor EM. Thus, it is possible that these elements of the planetary transmission PG are interconnected under the provision of a plus planetary transmission.

If, as shown in FIG. 1, the electric motor EM engages at the sun gear PS2 of the planetary transmission, the internal combustion engine VM engages at the ring gear PH2 of the planetary transmission PG and the idler of the gear ratio step K1 of the pre-shift group GV engages at the bar PT2 of the planetary transmission PG, and if the standard transmission gear ratio i0 of the planetary transmission PG is "i0=−2", the following ratios of moments M are controlling for the planetary transmission PG1:

$$M_{VM}/M_{EM}=2$$

$$M_{PT2}/M_{EM}=3$$

$$M_{PT2}/M_{VM}=1.5$$

whereas the signs for the moments are defined in such a manner that each positive moment appears in the pull operation and each negative moment appears in the push operation.

The following relationship applies to rotational speeds n on the planetary transmission PG:

$$n_{EM}=3 \cdot n_{PT2}-2 \cdot n_{VM}$$

whereas the signs of the rotational speeds are defined in such a manner that positive rotational speeds for forward travel arise in a forward gear for the closed shift element A of the shift packet SV of the pre-shift group GV.

As examples, a gear transmission ratio of 1.29 applies to the low gear ratio step of the pre-shift group GV, and a gear ratio of 1.0 applies to the high gear ratio step of the pre-shift group GV.

If neither the shift element A of the shift packet SV nor the shift element B of the shift packet SV of the pre-shift group GV is shifted or closed, as the case may be, the moment MVM provided by the internal combustion engine VM is superelevated by a factor of 1.5, the moment MEM provided by the electric motor EM increases by a factor of 3, and the rotational speeds are determined through the equation above.

If the shift element A is shifted or closed, as the case may be, the planetary transmission PG is directly bridged, whereas, in the so-called "block cycle," all three shafts of the planetary transmission PG then rotate at the same rotational speed n. For the internal combustion engine VM, the low gear ratio step of the pre-shift group GV takes effect, likewise in this case the electric motor EM takes effect, on the low gear ratio step of the pre-shift group GV. In this case, the moments MVM and MEM provided by the internal combustion engine VM and the electric motor EM are not superelevated by the planetary transmission PG.

If the shift element B of the shift packet SV of the pre-shift group GV is shifted or closed, as the case may be, the planetary transmission PG is indirectly bridged and is not found in the block cycle, such that a differential rotational speed between the elements of the planetary transmission PG is present on the same.

For the internal combustion engine VM, the high gear ratio step of the pre-shift group GV then takes effect, since the internal combustion engine VM is directly linked to the gear ratio step K2 through the shift element B of the shift packet SV.

In this case, the moment $M_{VM}$ provided by the internal combustion engine VM is not superelevated by the planetary transmission PG. However, with a closed shift element B of the shift packet SV, the moment $M_{EM}$ provided by the electric motor EM is superelevated by a factor of 1.87, the electric motor EM rotates faster then the internal combustion engine VM by a factor of 1.87.

With a closed shift element B of the shift packet SV of the pre-shift group GV, the bar PT2 of the planetary transmission PG is connected to the gear ratio step K1, such that the low gear ratio step of 1.29 takes effect for the bar PT2. With a closed shift element B, the ring gear PH2 is connected to the gear ratio step K2 of the pre-shift group GV, such that the high gear ratio step of 1.0 of the pre-shift group GV take effect for the ring gear PH2. The sun gear PS2 must compensate for the difference in rotational speeds, and rotates 1.87 times as quickly as the ring gear PH2 of the planetary transmission PG, which directly arises from the rotational speed equation above.

In the case in which, for the closed shift element B of the shift packet SV, the moment $M_{EM}$ provided by the electric motor EM amounts to 100 Nm, the moment of the bar PT2 of the planetary transmission PG amounts to 300 Nm and the moment of the ring gear PH2 of the planetary transmission PG amounts to 200 Nm. At the entrance of the main transmission HG, 387 Nm (300 Nm·×1.29) takes effect from the bar PT2 of the planetary transmission PG. Of them, 200 Nm go back to the ring gear PH2, such that 187 Nm are effective at the entrance of the main transmission HG. Out of this, the superelevation of the moment $M_{EM}$ provided by the electric motor EM by a factor of 1.87 takes place.

It directly follows from this that the connection of the electric motor EM and the planetary transmission PG, which together provide an electrodynamic drive system, is particularly advantageous to the pre-shift group GV, since the pre-shift group GV designed as a split group has a relatively small spread. Therefore, rotational speed differences and idle power are minimized. In addition, the electric motor EM may be disengaged at a smaller rotational speed range.

If, with a drive train configuration, a motor vehicle in accordance with FIG. 1 is to be driven purely electrically with the internal combustion engine decoupled from the input shaft $W_{GE}$ of the range-change transmission CT through the opening of the starting clutch AK, a gear is engaged in the pre-shift group GV, in the main transmission HG and in the post-shift group GP (if present) of the range-change transmission CT, whereas the pre-shift group GV is preferably operated in the high gear ratio step K2 with a closed shift element B, and the main transmission HG is preferably operated in the first gear with a closed shift element E of the shift packet S2 of the main transmission HG. A post-shift group GP (if present) is then preferably operated at a slow speed. In this case, the electric motor EM is then translated with a higher gear ratio than the first gear in the main transmission HG, because the planetary transmission PG is also spread, such as in the above numerical example, by a factor of 1.87.

If a high electric, motorized or generator moment is required, in the pre-shift group GV, the high gear ratio step is preferably selected by closing the shift element B of the shift packet SV. In this case, the electric motor EM is then translated higher, in the above numerical example by a factor of 1.87. In this respect, it can therefore be advantageous that, for starting in the pre-shift group GV, the shift element B is to be closed or shifted, as the case may be, since, for starting with a combined internal combustion motor and an electric motor, through the internal combustion motor VM and the electric motor EM, a greater moment is contributed through the electric motor EM, and thus the slip-controlled starting clutch AK can be unburdened.

If there is electrodynamic driving or starting for the drive train of FIG. 1, for this, the internal combustion engine VM is coupled at the input shaft $W_{GE}$ of the range-change transmission CT, for which the starting clutch AK is closed in FIG. 1. In the pre-shift group GV, neither the shift element A nor the shift element B is shifted, such that the pre-shift group GV is then found in neutral. However, a gear is shifted in the main transmission HG and in the post-shift group GP (if present), for starting a corresponding starting gear.

Thus, for electrodynamic starting, the electric motor EM can support the moment provided by the internal combustion engine VM, such that a drive moment is then provided on the axle drive AB. The electrodynamic driving or starting, as the case may be, can be terminated by engaging a gear in the pre-shift group GV, thus by closing the shift element A or B.

If, for electrodynamic starting, in which, as described above, the internal combustion engine VM is coupled to the input shaft $W_{GE}$ of the range-change transmission CT and no gear is engaged in the pre-shift group GV, the desired traction power of the electrodynamic starting cannot be provided or furnished, because, for example, the electric motor EM cannot support enough moment torque because an electrical energy storage device is too full or too empty, there is a change from electrodynamic starting to starting through the starting clutch AK, for which, through the reduction of the transmission capability of the starting clutch AK, the same is brought into slip. Subsequently, through the adjustment of the moment provided by the electric motor EM and/or through the adjustment of the transmission capability of the starting clutch AK, the rotational speed can be changed in such a manner that one of the shift elements A, B of the shift packet SV of the pre-shift group GV is synchronized, whereas a gear is then engaged in the pre-shift group GV, namely through the closing or shifting, as the case may be, of the synchronized shift element A or B. Subsequently, the starting process can then be continued conventionally through the internal combustion engine VM at the slipping starting clutch AK, if necessary with the support of the electric motor EM. The slipping starting clutch AK may be unburdened through the electric motor EM.

It is also possible to change from starting through the starting clutch AK to electrodynamic starting, whereas, in such case in an initial situation, thus when starting through the starting clutch AK, the starting clutch AK is slip-controlled, either at the closed shift element A or the closed shift element B. A gear is likewise engaged in the main transmission HG. In order to then ensure the transition to electrodynamic starting, the moment provided by the electric motor EM and/or the moment provided by the internal combustion engine VM is initially influenced to the effect that the shift element A or B to be disengaged of the shift packet SV of the pre-shift group GV is load-free, and the desired course of the pulling force continues to arise at the axle drive AB. Thereby, the pulling force remains in place at the axle drive AB. The shift element A or B to be disengaged of the shift packet SV of the pre-shift group GV shift is then load-free, if the ratio of moments of the internal combustion engine VM and the electric motor EM corresponds to the fixed transmission gear ratio of the planetary transmission PG. If the electric motor EM cannot provide a sufficiently large moment, the load is accordingly reduced at the internal combustion engine VM or the starting clutch AK, as the case may be, in order to ensure the absence of load of the shift element A or B to be disengaged. If the shift element A or B is load-free, the shift element to be disengaged, whereas subsequently, through the adjustment of the transmission capability of the starting clutch AK and/or through the adjustment of the moment provided by the electric motor EM, the rotational speed is changed in such a manner that the starting clutch AK is synchronized. Thereby, the starting clutch AK then automatically comes into adherence, whereas the starting clutch AK is then closed. Subsequently, the starting process can then be continued electrodynamically.

If the internal combustion engine VM is to be started through the electric motor EM, or if a charging operation for the charging of an electrical energy storage device is desired, the pre-shift group GV is operated in the high gear ratio step K2 through the closing of the shift element B of the shift packet SV of the pre-shift group GV. In the above example, starting the internal combustion engine VM requires a moment that is lower by a factor of 1.87 than would be necessary for a direct connection between the internal combustion engine VM and the electric motor EM. In the charging operation, the electric motor rotates by a factor of 1.87 faster than the internal combustion engine VM, such that a greater generator power is provided. For the axle drive AB, it preferable that the main transmission HG is shifted to neutral both upon starting the internal combustion engine VM and in the charging operation, such that either the start of the internal combustion engine or the charging operation is independent of the driving speed. Then, no brake application at a service brake of the motor vehicle is required.

In the pre-shift group GV, a load shifting can also be carried out. In this case, the starting clutch AK is closed in the initial situation, the internal combustion engine VM is accordingly coupled to the input shaft $W_{GE}$ of the range-change transmission CT, whereas, in the pre-shift group GV, a gear is engaged either through the shifting of the shift element A or through the shifting of the shift element B. A gear is likewise engaged in the main transmission HG. If, in the pre-shift group GV, there is then a shifting under load, a change from shift element A to shift element B or, conversely, from shift element B to shift element A, takes place.

For this, the moment provided by the internal combustion engine VM and/or the moment provided by the electric motor EM is influenced to the effect that the shift element A or B previously closed and to be disengaged of the shift packet SV is load-free, under the simultaneous provision of a desired course of the pulling force at the axle drive AB. Upon an upshift, the pulling force can be reduced at the level of the target gear. The shift element A or B to be disengaged is load-free, if the ratio of moments of the internal combustion engine VM and the electric motor EM corresponds to the fixed gear ratio i0 of the planetary transmission PG. If the electric motor EM is not able to apply sufficient moment, the load is reduced at the internal combustion engine VM. In this case, a reduction in the pulling force must then be accepted. If the shift element A or B to be disengaged is load-free, the shift element to be disengaged is disengaged. Subsequently, a synchronization of the shift element B or A to be engaged takes place through a change or adjustment, as the case may be, of the moments of the internal combustion engine VM and/or of the electric motor EM, while maintaining the pulling force, whereas, after synchronization, the shift element B or A to be engaged is closed or engaged, as the case may be. The change in load at the internal combustion engine VM and the electric motor EM takes place according to the desired operating strategy. Alternatively, the pre-shift group GV, preferably designed as a split group, can also be shifted with an interruption of the pulling force, if the load at the internal combustion engine VM is completely released.

For the synchronization of the main transmission HG in connection with the execution of a shift under an interrupted pulling force in the main transmission HG for the internal combustion engine VM coupled at the input shaft $W_{GE}$ of the range-change transmission CT, and with a pre-shift group GV in neutral, the synchronization of the main transmission HG is performed through the electric motor EM, by which the internal combustion engine VM remains coupled at the transmission input shaft $W_{GE}$. In this case, a synchronization of the main transmission HG for the pre-shift group GV is therefore in neutral. The synchronization is carried out with the assistance of a corresponding adjustment of the rotational speed of the internal combustion engine VM and/or the electric motor EM. The starting clutch AK remains closed, because otherwise the rotational speed of the input shaft $W_{GE}$ of the pre-shift group GV and thus of the range-change transmission CT would not be defined.

A synchronization of the main transmission HG is also possible, if a gear is engaged in the pre-shift group GV by closing the shift element B or A of the shift packet SV. In this case, for the synchronization of the main transmission HG in connection with the execution of a shift under an interrupted pulling force of the main transmission HG through a rotational speed control, the electric motor EM performs the synchronization, whereas the starting clutch AK may thereby either remain closed, or can be opened. If the starting clutch AK remains closed, the moment of the internal combustion engine VM can be adjusted such that the internal combustion engine participates in the synchronization. On the other hand, if the starting clutch AK is open, the synchronization takes place only through the electric motor EM.

Figure 2:
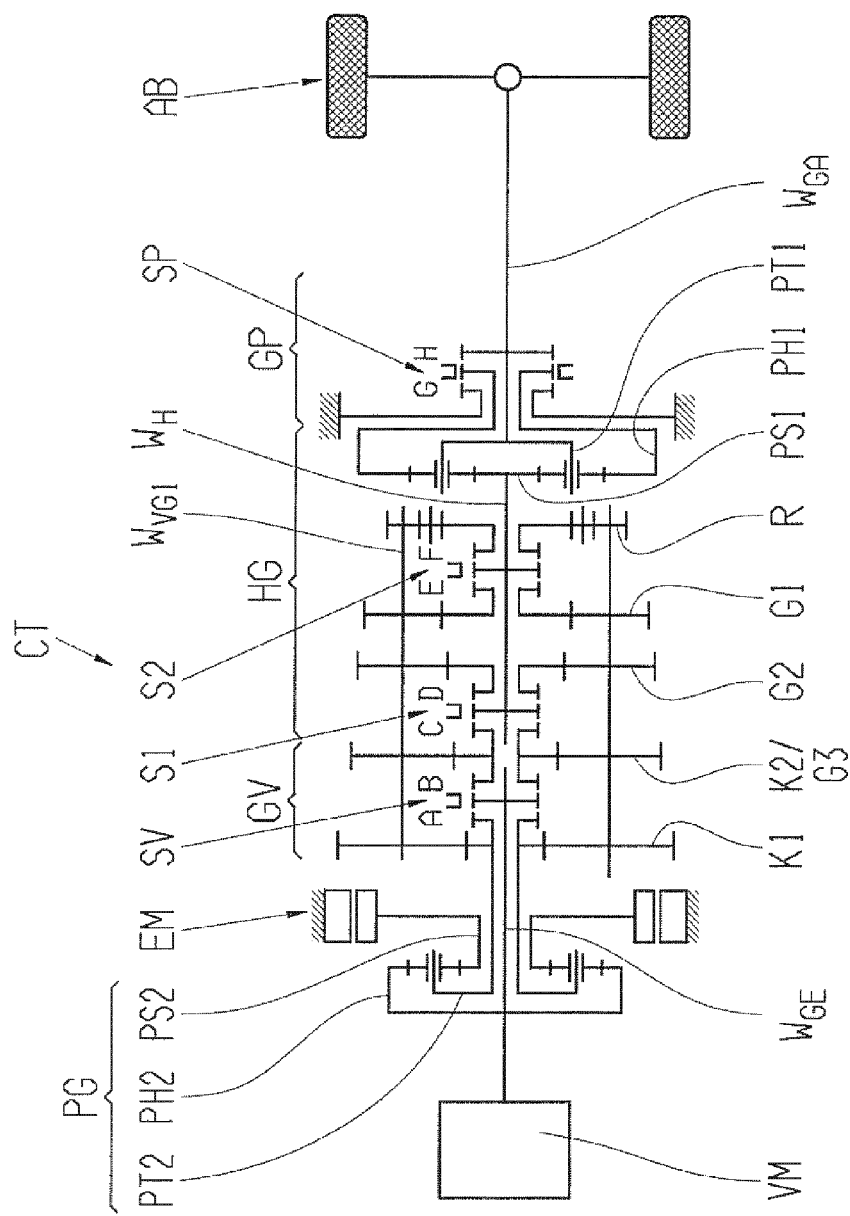
FIG. 2 is a diagram of a drive train with a range-change transmission under the invention along with a drive unit and an axle drive according to a second embodiment of the invention.

FIG. 2 shows a drive train of a motor vehicle with a range-change transmission CT according to a second embodiment of the invention, whereas the variant of FIG. 2 is distinguished from the variant of FIG. 1 only by that fact that no starting clutch AK is present, in the variant of FIG. 2, therefore, the internal combustion engine VM is permanently coupled to the transmission input shaft $W_{GE}$. In this case, the methods described above are also feasible, with the exception of such methods in which the starting clutch AK must be opened partially for slip control, or also completely opened.

Figure 3:
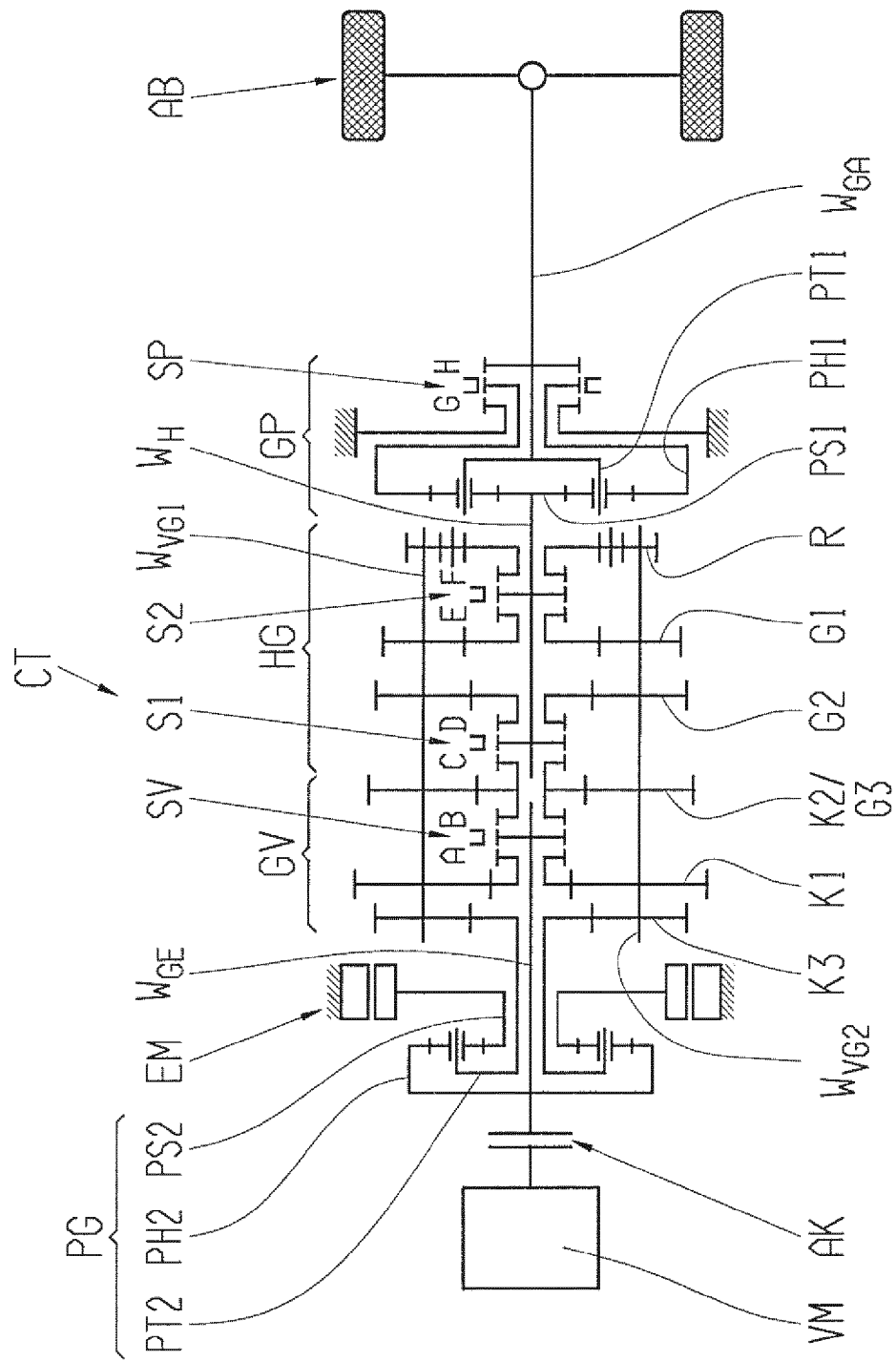
FIG. 3 is a diagram of a drive train with a range-change transmission under the invention along with a drive unit and an axle drive according to a third embodiment of the invention.

Another variant of the invention is shown in FIG. 3, whereas an additional gear ratio step K3 is present in FIG. 3. In the variant of FIG. 3, the gear ratio step K3 is shifted between the third element of the planetary transmission PG, thus between the bar PT2 of the planetary transmission PG, and the or each lay shaft $W_{VG1}$, $W_{VG2}$, the gear ratio of which lies between the gear ratio of the shiftable low gear ratio step K1 and the gear ratio of the shiftable high gear ratio step K2 of the pre-shift group GV. Thereby, the idle power at the planetary transmission PG can be further reduced, even if either the shift element A or the shift element B of the shift packet SV is closed.

FIGS. 4 to 10 show embodiments of the range-change transmission CT under the invention, in which an additional shift packet SE1, SE2, SE3, SE1', SE2' or SE3' is present, each of which includes two shift elements I and J.

Figure 4:
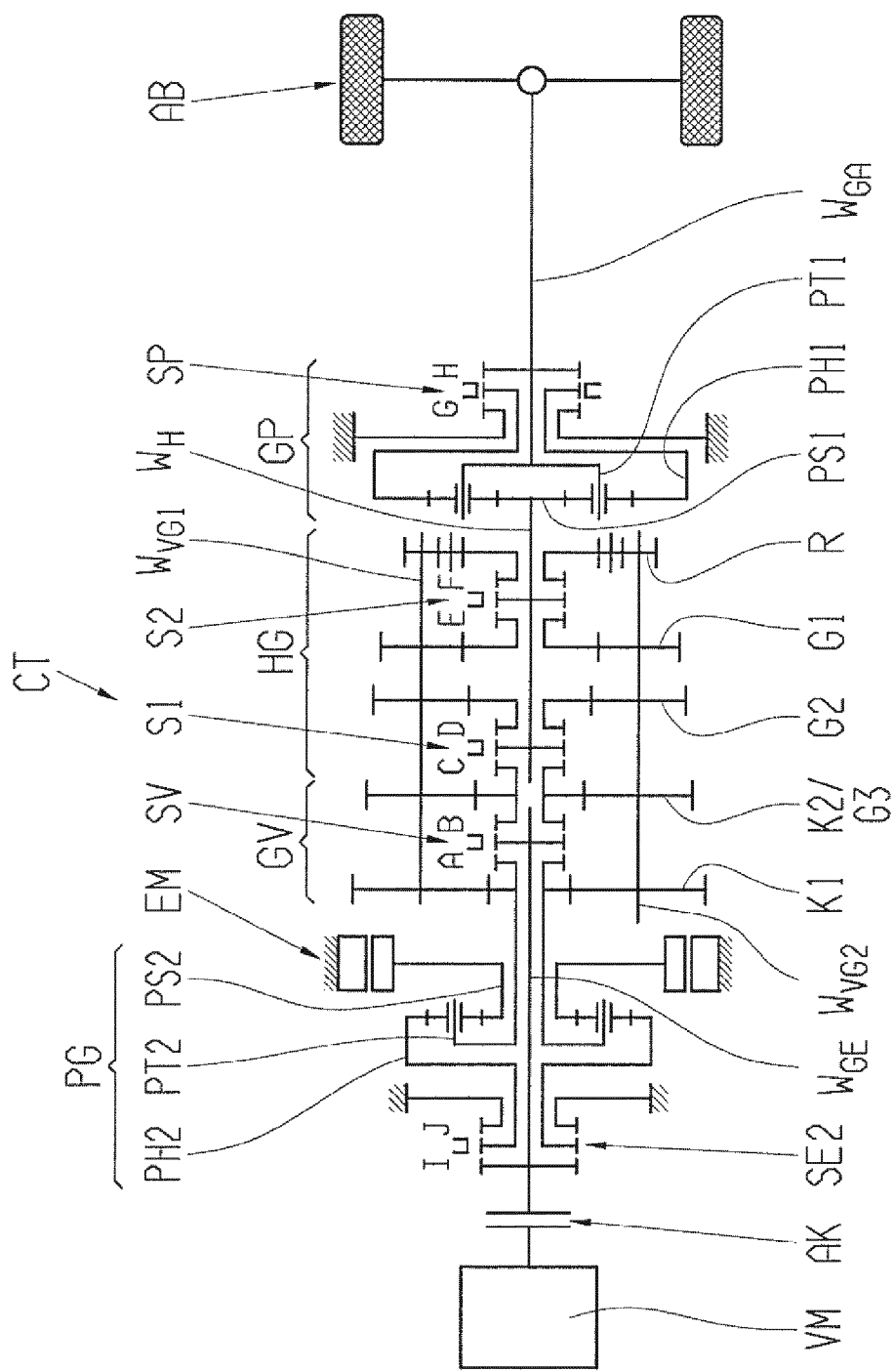
FIG. 4 is a diagram of a drive train with a range-change transmission under the invention along with a drive unit and an axle drive according to a fourth embodiment of the invention.

In the embodiment of FIG. 4, the range-change transmission CT includes the shift element SE2, through which the coupling of the second element of the planetary transmission PG, namely of the ring gear PH2 of the planetary transmission PG, is shiftable with the input shaft $W_{GE}$ of the range-change transmission CT and thus the input shaft of the pre-shift group GV, whereas, in the shift position I, thus with a closed shift element I, the second element, thus the ring gear PH2, of the planetary transmission PG is coupled with the input shaft $W_{GE}$ of the range-change transmission CT and thus the input shaft of the pre-shift group GV, whereas this coupling is broken with an open shift element I.

If the shift element I is open, the same can either occupy a neutral position to avoid zero load losses at the electric motor EM.

However, as an alternative, in FIG. 4, the shift element J may also be closed, in order to provide a fixed housing connection for the second element of the planetary transmission PG, namely the ring gear PH2 of the planetary transmission PG.

If, in the embodiment of FIG. 4, the shift element I is closed in the shift packet SE2, the arrangement of FIG. 1 is provided with an electrodynamic drive system, whereas, if the shift element J is closed, a so-called "ISG arrangement" is provided at the pre-shift group GV. The planetary transmission PG then takes effect as a constant gear ratio for the electric motor EM. A switching between the shift element I and the shift element J is possible under load, even if a gear is engaged in the pre-shift group GV, namely in the shift packet SV, thus either the shift element A or the shift element B is shifted or closed, as the case may be. Through a reduction in load at the electric motor EM and an absorption of the load by the internal combustion engine VM, the shift element I or J to be disengaged of the shift packet SE2 may be made load-free, whereas a subsequent synchronization of the shift element J or I to be engaged takes place through a rotational speed control of the electric motor EM. If necessary, through a slip control of the starting clutch AK, the reduction in load may take place on the shift element of the shift packet SE2 to be disengaged.

Figure 5:
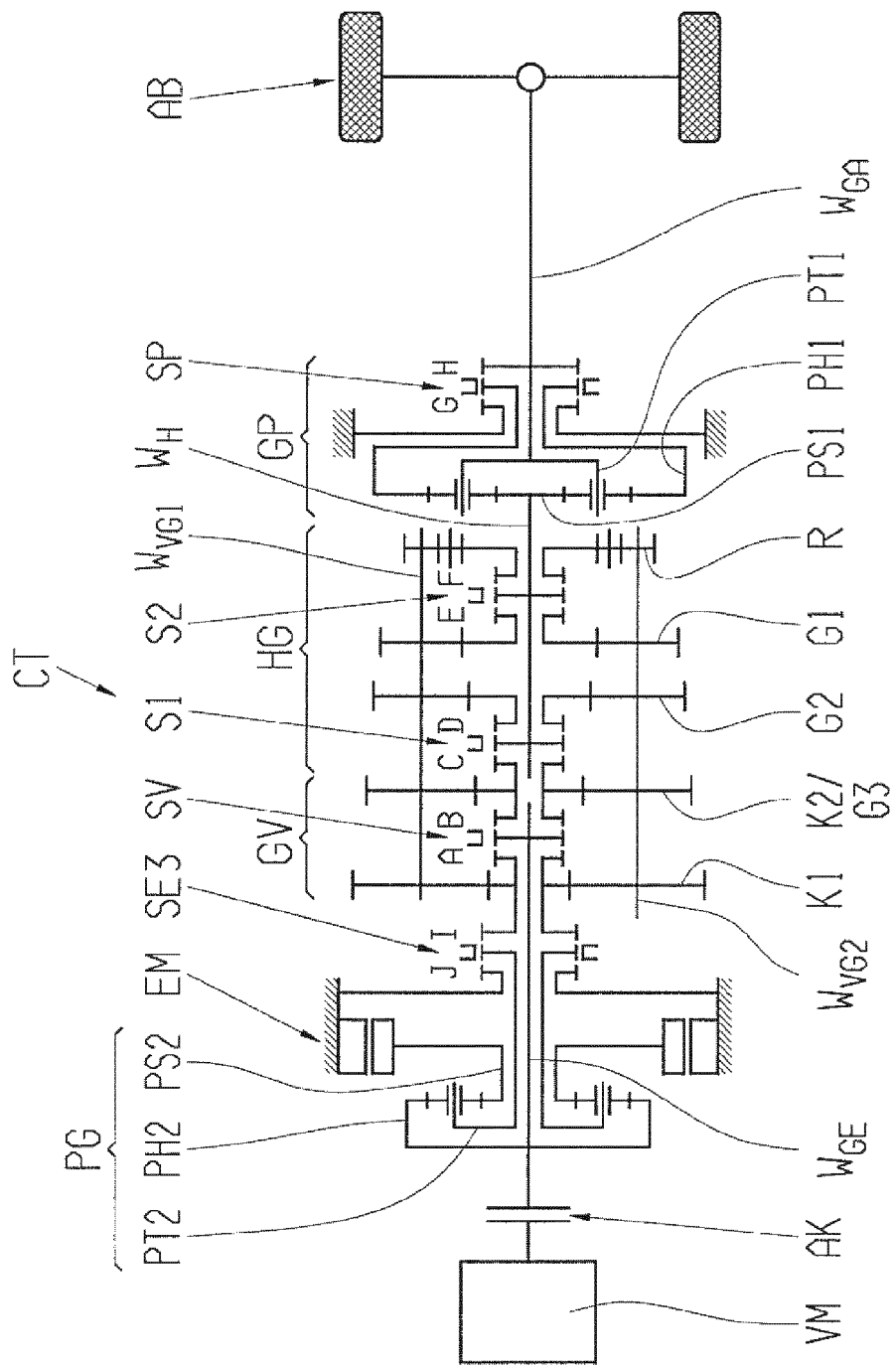
FIG. 5 is a diagram of a drive train with a range-change transmission under the invention along with a drive unit and an axle drive according to a fifth embodiment of the invention.

In the variant of FIG. 5, a shift element SE3 is present; this arranges in a shiftable manner the coupling of the third element of the planetary transmission PG, thus of the bar PT2, of the planetary transmission PG, with the output shaft of the pre-shift group GV or the input shaft of the main transmission HG, as the case may be, whereas this shift packet SE3 also includes the two shift elements I and J. If the shift element I is closed, the third element, thus the bar PT2, of the planetary transmission PG, is coupled with the output shaft of the pre-shift group GV. On the other hand, if the shift element J is closed, there is a fixed housing connection of the third element, thus of the bar PT2, of the planetary transmission PG. With a closed shift element I, there is in turn an arrangement with an electrodynamic drive system, and, with a closed shift element J, there is a so-called "ISG arrangement" at the transmission input. The planetary transmission PG then acts as a constant gear ratio for the electric motor EM. Moreover, in the variant of FIG. 5, the shift packet SE3 may be switched under load between the shift elements I and J, in the manner described above for the variant of FIG. 4.

Figure 6:
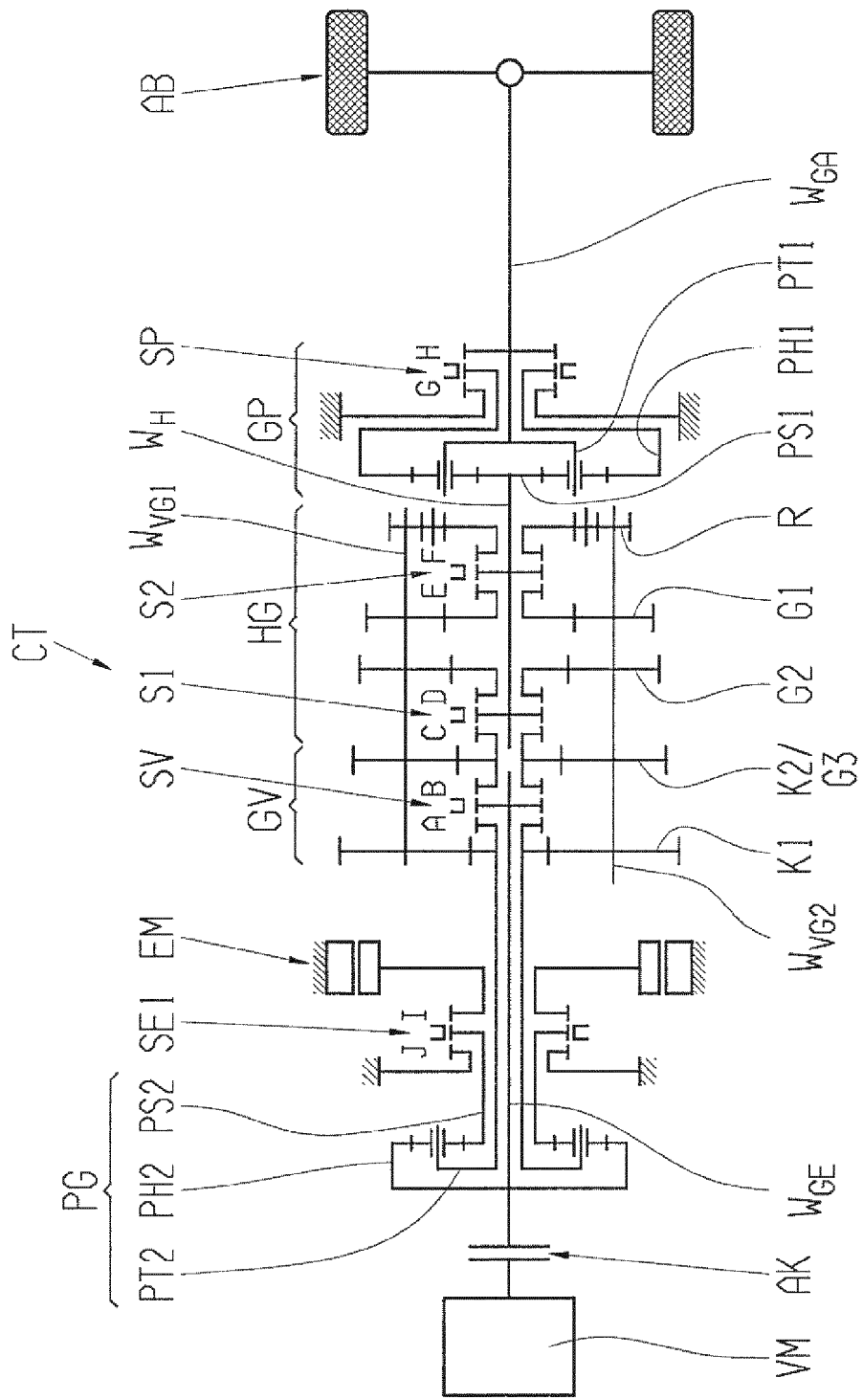
FIG. 6 is a diagram of a drive train with a range-change transmission under the invention along with a drive unit and an axle drive according to a sixth embodiment of the invention.

In the variant of FIG. 6, an additional shift packet SE1 is present, through which the coupling of the first element of the planetary transmission PG, thus of the sun gear PS2, is shiftable with the electric motor EM. The shift packet SE1 in turn possesses the shift elements I and J, whereas, with the closed shift element I, the sun gear PS2 of the planetary transmission PG is coupled with the electric motor EM, while, with a closed shift element J, there is a fixed housing connection of the sun gear PS2 of the planetary transmission PG.

If the shift element I is closed, there is in turn an arrangement with an electrodynamic drive system. If the shift element J is closed, an additional shorter gear may be provided for the internal combustion engine VM.

With a closed shift element J, the gear ratio of the planetary transmission PG also takes effect for the gear ratio step K1 of the pre-shift group GV. As a result, the pre-shift group GV then possesses three gears, such that there is an additional gear for the pre-shift group GV. Through this, for a heavy load, there can be advantageous starting.

Moreover, in the variant of FIG. 6, the shift element SE1 can be shifted under load, but not as described in connection with the embodiments of FIGS. 4 and 5, because, through a reduction in load at the electric motor EM, the shift element J of the shift packet SE1 is not load-free. Rather, the shift element J supports the load of the internal combustion engine VM, and cannot be shifted under differential rotational speed. Rather, the shift element J must be conventionally synchronized, either with the opened starting clutch AK or actively through the internal combustion engine VM and the starting clutch AK. There can be no active synchronization through the electric motor EM.

As already stated, in the variants of FIGS. 4, 5 and 6, the shift element J, through which a fixed housing connection can be provided, is omitted.

Figure 7:
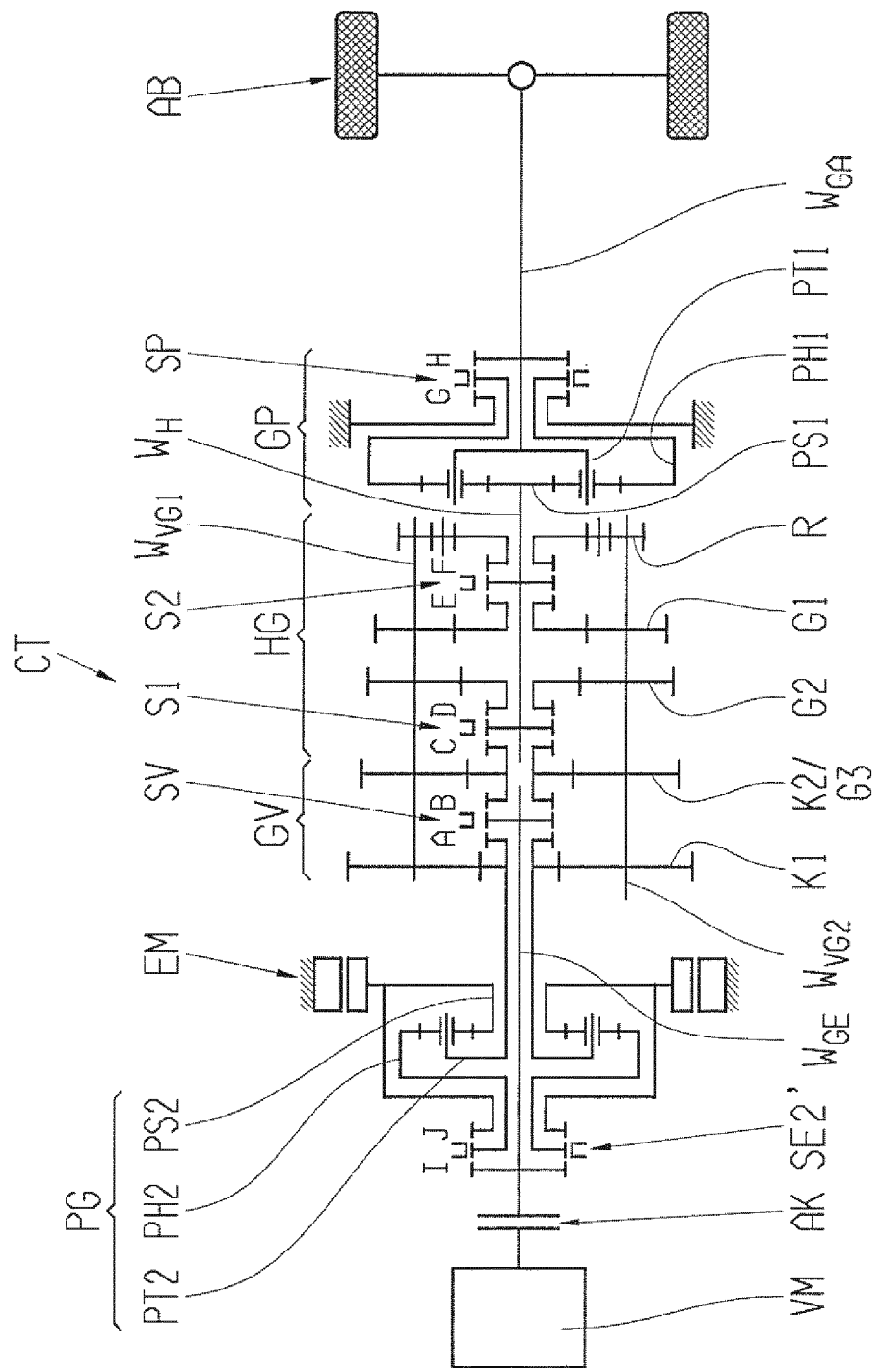
FIG. 7 is a diagram of a drive train with a range-change transmission under the invention along with a drive unit and an axle drive according to a seventh embodiment of the invention.

FIG. 7 shows one variant of the invention, in which an additional shift packet SE2' with the shift elements I and J is present, whereas, in the embodiment of FIG. 7, in turn, the second element of the planetary transmission PG, thus the ring gear PH2 of the same, is shiftable in its connection to the input shaft of the pre-shift group GV and thus to the input shaft $W_{GE}$ of the range-change transmission CT. Thereby, through the shift element J, the ring gear PH2 of the planetary transmission PG can be coupled to the sun gear PS2, such that planetary transmission PG is then operated and bridged in the block cycle. With a closed shift element I, an arrangement with an electrodynamic drive system is provided, and, with a closed shift element J, a so-called "ISG arrangement" is provided at the pre-shift group GV. The method for switching the shift element SE2' under load corresponds to the manner described in connection with FIG. 4 for the shift element SE2.

Figure 8:
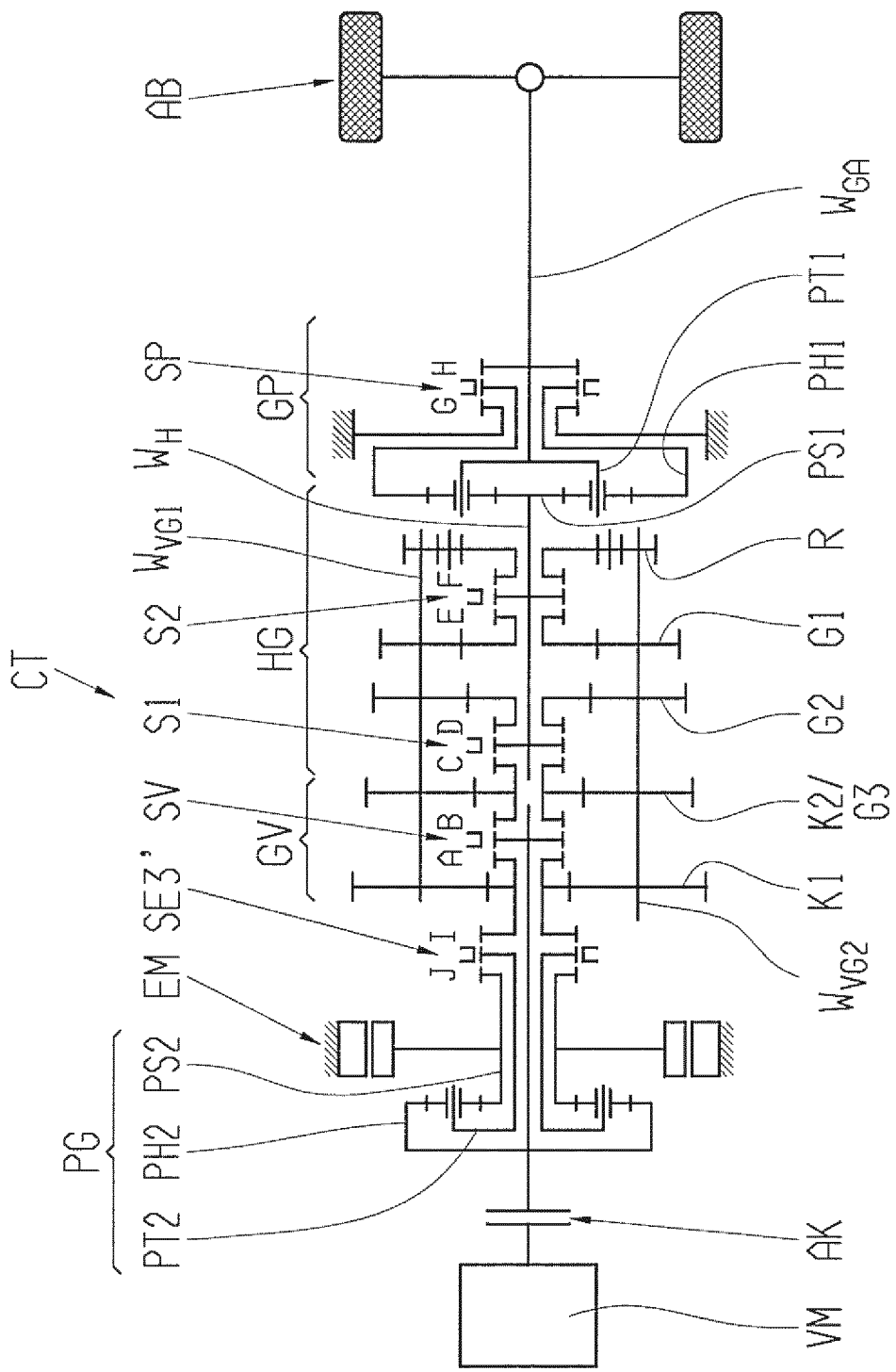
FIG. 8 is a diagram of a drive train with a range-change transmission under the invention along with a drive unit and an axle drive according to an eighth embodiment of the invention.

In FIG. 8, a shift element SE3' is present, through which the connection of the third element of the planetary transmission PG, thus of the bar PT2, is shiftable, whereas, with a closed shift element I, the bar PT2 is coupled to the output shaft of the pre-shift group GV, and whereas, with a closed shift element J, the bar PT2 is coupled to the sun gear PS2 of the planetary transmission PG, such that the planetary transmission PG with a closed shift element J is in turn bridged and operated in the block cycle. With a closed shift element I, there is in turn an arrangement with an electrodynamic drive system and, with a closed shift element J, there is an ISG arrangement at the transmission input, whereas the switching of the shift element SE3' under load takes place between the shift elements I and J in the manner described for the shift element SE3.

Figure 9:
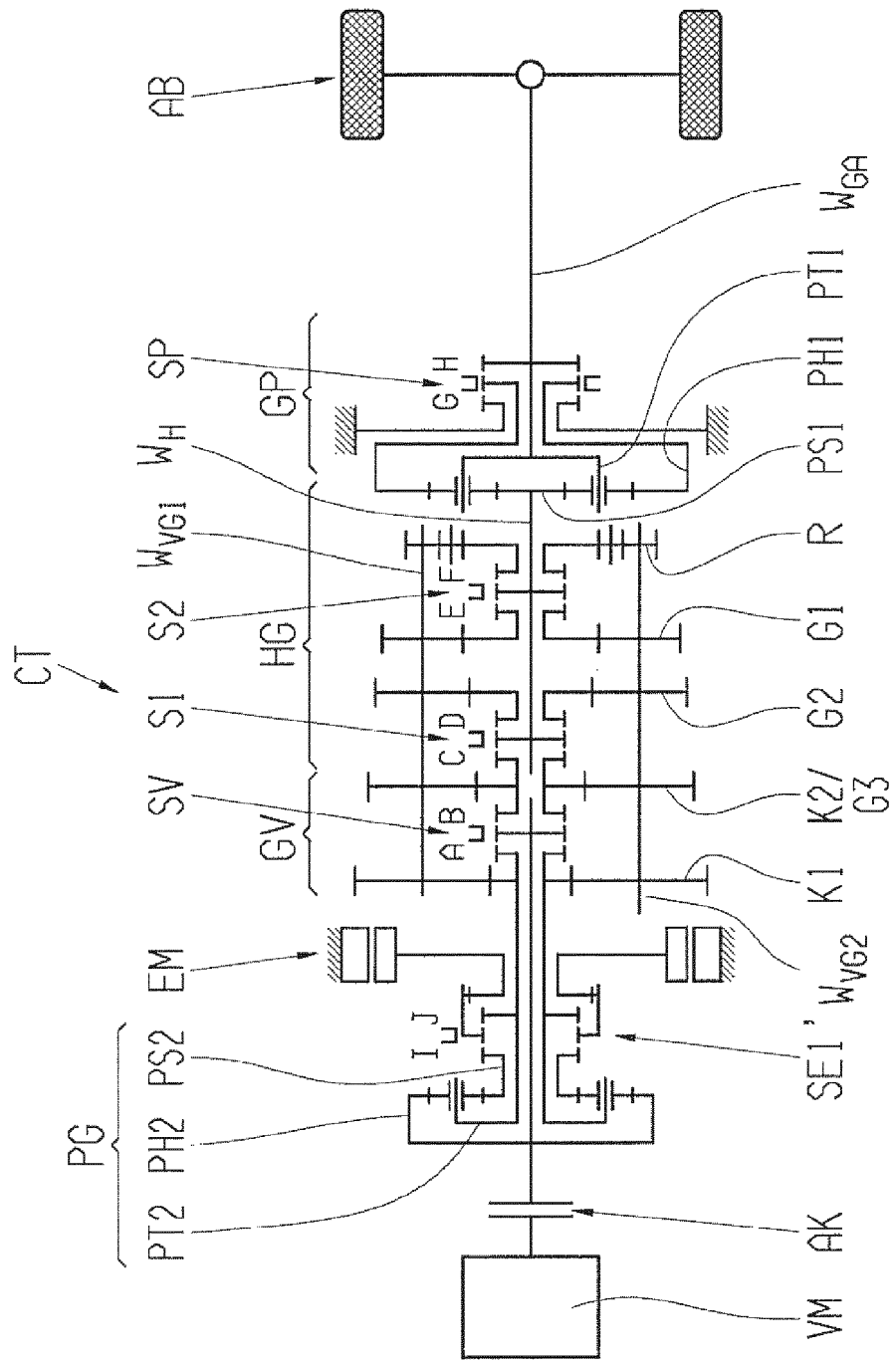
FIG. 9 is a diagram of a drive train with a range-change transmission under the invention along with a drive unit and an axle drive according to a ninth embodiment of the invention.
Figure 10:
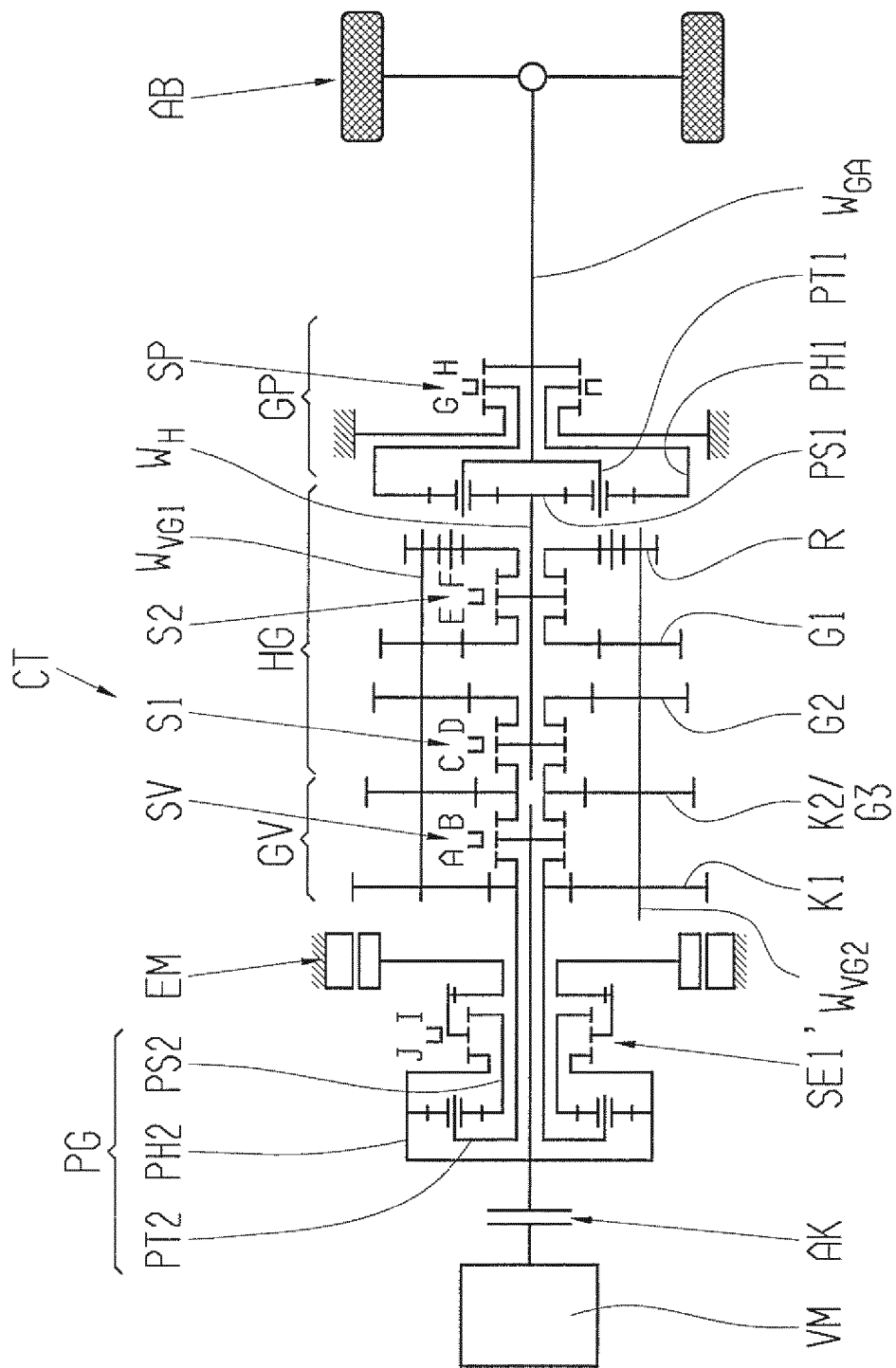
FIG. 10 is a diagram of a drive train with a range-change transmission under the invention along with a drive unit and an axle drive according to a tenth embodiment of the invention.

FIGS. 9 and 10 show additional variants of the invention with an additional shift packet SE1' with the shift elements I and J. These variants are functionally equivalent to the variants of FIGS. 7 and 8. In each of the variants of FIGS. 9 and 10, the electric motor EM is made switchable between a shaft of the planetary transmission PG with a closed shift element I and a shaft of the range-change transmission CT with a closed shift element J, such that, with a closed shift element J, the planetary transmission PG runs in parallel empty or without moment, as the case may be.

Accordingly, in the variant of FIG. 9, the connection of those elements of the planetary transmission PG, which is coupled to the electric motor EM, thus the sun gear PS2 of the planetary transmission PG, is able to be shifted. The electric motor EM is able to be connected in a switchable manner through the shift packet SE1' between the sun gear PS2 of the planetary transmission PG and the output shaft of the pre-shift group GV, whereas, with a closed shift element J, the planetary transmission runs in parallel without moment. With a closed shift element I, there is an arrangement with an electrodynamic drive system and, with a closed shift element J; there is an ISG arrangement at the pre-shift group GV.

If, in FIG. 9, neither the shift element I nor the shift element J is closed, the electric motor EM is also completely able to be coupled. For switching between the shift elements I and J of the shift packet SE1' under load, it is provided that the switching only occurs if a gear is engaged in the pre-shift group GV, thus either the shift element A or the shift element B of the shift packet SV of the pre-shift group is closed, whereas, a reduction in load takes place at the electric motor EM under an absorption of the load by the internal combustion engine VM. If the rotational speed of the input shaft of the pre-shift group is too low, the starting clutch AK may be slip-controlled. By influencing the moments of the electric motor EM and the internal combustion engine VM, the shift element to be disengaged of the shift packet SE1' is made load-free, whereas the load-free shift element can then be disengaged. A synchronization of the shift element to be engaged takes place in the rotational speed control operation through the electric motor EM, whereas the same is shifted or closed, as the case may be, after the synchronization of the shift element to be engaged of the shift packet SE1'.

In the variant of FIG. 10, the connection of those elements of the planetary transmission PG, which is coupled to the electric motor EM, thus the connection of the sun gear PS2 of the planetary transmission PG, is in turn shiftable, whereas the electric motor EM between the sun gear PS2 of the planetary transmission PG and the input shaft of the pre-shift group GV is able to be connected in a switchable manner.

If the shift element I is closed, the sun gear PS2 of the planetary transmission PG is coupled to the electric motor EM. On the other hand, if the shift element J is closed, in FIG. 10, the electric motor EM is coupled to the input shaft of the pre-shift group GV. In this case, the planetary transmission may in turn run in parallel without moment, whereas, in this case with a closed shift element I, there is an arrangement with an electrodynamic drive system, with a closed shift element J, there is an ISG arrangement at the transmission input without a gear ratio for the electric motor EM through the planetary transmission PG. If neither the shift element I nor the shift element J is closed, for the variant of FIG. 10, the electric motor EM is also completely able to be coupled. In the embodiment of FIG. 10, the switching between the shift elements I, J under load takes place by analogy to the embodiment of FIG. 9.

Modifications and variations can be made to the embodiments illustrated or described herein without departing from the scope and spirit of the invention as set forth in the appended claims.

The invention claimed is:

1. An automated range-change transmission for a motor vehicle having a hybrid drive unit with an internal combustion engine and an electric motor, comprising:
   a main transmission having a main shaft and at least one lay shaft;
   a pre-shift group drivingly connected upstream of the main transmission, the pre-shift group configured as a split group;
   an input shaft configured for coupling to the internal combustion engine of the motor vehicle;
   an output shaft configured for coupling with a drive axle of the motor vehicle;
   a planetary transmission for coupling the electric motor to the pre-shift group;
   the planetary transmission having a first element coupling the electric motor to the planetary transmission, the first element being a sun gear;
   the planetary transmission having a second element coupled to an input shaft of the pre-shift group, whereas the input shaft of the pre-shift group corresponds to the input shaft of the range-change transmission, the second element being a ring gear;
   the planetary transmission having a third element coupled with an output shaft of the pre-shift group via an idler gear of the pre-shift group mounted coaxially to the input shaft of the pre-shift group, the output shaft of the pre-shift group corresponds to the lay shaft of the main transmission, the third element being a planetary carrier; and
   further comprising a first shift packet through which the second element of the planetary transmission is coupled with the input shaft of the range-change transmission in a first shift position of the first shift packet.

2. An automated range-change transmission for a motor vehicle having a hybrid drive unit with an internal combustion engine and an electric motor, comprising:
   a main transmission having a main shaft and at least one lay shaft;
   a pre-shift group drivingly connected upstream of the main transmission, the pre-shift group configured as a split group;
   an input shaft configured for coupling to the internal combustion engine of the motor vehicle;
   an output shaft configured for coupling with a drive axle of the motor vehicle;
   a planetary transmission for coupling the electric motor to the pre-shift group;
   the planetary transmission having a first element coupling the electric motor to the planetary transmission, the first element being a sun gear;
   the planetary transmission having a second element directly coupled to an input shaft of the pre-shift group without an intervening coupling element, whereas the input shaft of the pre-shift group corresponds to the input shaft of the range-change transmission, the second element being a ring gear;
   the planetary transmission having a third element coupled with an output shaft of the pre-shift group via an idler gear of the pre-shift group mounted coaxially to the input shaft of the pre-shift group, the output shaft of the pre-shift group corresponds to the lay shaft of the main transmission, the third element being a planetary carrier; and
   further comprising a shift packet through which the first element of the planetary transmission is coupled with the electric motor in a first shift position of the shift packet.

3. An automated range-change transmission for a motor vehicle having a hybrid drive unit with an internal combustion engine and an electric motor, comprising:
   a main transmission having a main shaft and at least one lay shaft;

a pre-shift group drivingly connected upstream of the main transmission, the pre-shift group configured as a split group;
an input shaft configured for coupling to the internal combustion engine of the motor vehicle;
an output shaft configured for coupling with a drive axle of the motor vehicle;
a planetary transmission for coupling the electric motor to the pre-shift group;
the planetary transmission having a first element coupling the electric motor to the planetary transmission, the first element being a sun gear;
the planetary transmission having a second element coupled to an input shaft of the pre-shift group, whereas the input shaft of the pre-shift group corresponds to the input shaft of the range-change transmission, the second element being a ring gear;
the planetary transmission having a third element coupled with an output shaft of the pre-shift group via an idler gear of the pre-shift group mounted coaxially to the input shaft of the pre-shift group, the output shaft of the pre-shift group corresponds to the lay shaft of the main transmission, the third element being a planetary carrier; and
further comprising one of (a) a first shift packet through which the second element of the planetary transmission is coupled with the input shaft of the range-change transmission in a first shift position of the first shift packet, or (b) a second shift packet through which the third element of the planetary transmission is coupled with the output shaft of the pre-shift group in a first shift position of the second shift packet, and wherein in a second shift position of the first or second shift packet, a respective one of the second or third elements of the planetary transmission is coupled to the first element of the planetary transmission so that the planetary transmission is bridged in a block cycle.

4. An automated range-change transmission for a motor vehicle having a hybrid drive unit with an internal combustion, engine and an electric motor, comprising:
a main transmission having a main shaft and at least one lay shaft;
a pre-shift group drivingly connected upstream of the main transmission, the pre-shift group configured as a split group;
an input shaft configured for coupling to the internal combustion engine of the motor vehicle;
an output shaft configured for coupling with a drive axle of the motor vehicle;
a planetary transmission for coupling the electric motor to the pre-shift group;
the planetary transmission having a first element coupling the electric motor to the planetary transmission, the first element being a sun gear;
the planetary transmission having a second element directly coupled to an input shaft of the pre-shift group without an intervening coupling element, whereas the input shaft of the pre-shift group corresponds to the input shaft of the range-change transmission, the second element being a ring gear;
the planetary transmission having a third element coupled with an output shaft of the pre-shift group via an idler gear of the pre-shift group mounted coaxially to the input shaft of the pre-shift group, the output shaft of the pre-shift group corresponds to the lay shaft of the main transmission, the third element being a planetary carrier; and
further comprising a third shift packet through which the first element of the planetary transmission is coupled with the electric motor in a first shift position of the third shift packet, and wherein in a second shift position of the third shift packet, the electric motor is coupled to the third element of the planetary transmission.

5. A method for operating a motor vehicle having an automated range-change transmission and a hybrid drive unit with an internal combustion engine and an electric motor, the automated range-change transmission having:
a main transmission with a main shaft and at least one lay shaft;
a pre-shift group drivingly connected upstream of the main transmission, the pre-shift group configured as a split group;
an input shaft configured for coupling to the internal combustion engine;
an output shaft configured for coupling with a drive axle of the motor vehicle;
a planetary transmission for coupling the electric motor to the pre-shift group, the planetary transmission having:
a first element coupling the electric motor to the planetary transmission, the first element being a sun gear;
a second element directly coupled to an input shaft of the pre-shift group without an intervening coupling element, whereas the input shaft of the pre-shift group couples to the input shaft of the range-change transmission, the second element being a ring gear; and
a third element coupled with an output shaft of the pre-shift group via an idler gear of the pre-shift group mounted coaxially to the input shaft of the pre-shift group, the output shaft of the pre-shift group couples to the lay shaft of the main transmission, the third element being a planetary carrier;
the method comprising:
decoupling the internal combustion engine from the input shaft of the range-change transmission for pure electric driving of the motor vehicle by engaging the pre-shift group and the main transmission; and
operating the pre-shift group in a high gear ratio step and the main transmission in a first gear.

6. The method as in claim 5, further comprising for electrodynamic driving or starting the motor vehicle with the internal combustion engine coupled to the input shaft of the range-change transmission, operating the pre-shift group in neutral and engaging the first, a second, or a third gear in the main transmission, and for providing a drive moment, supporting, by the electric motor, the drive moment the internal combustion engine provides.

7. The method as in claim 5, further comprising for starting of the internal combustion or charging of an electrical energy storage device through the electric motor, operating the pre-shift group in the high gear ratio step and operating the main transmission in neutral such that the start of the internal combustion engine or charging operation are independent of driving speed of the motor vehicle.

8. The method as in claim 5, further comprising for carrying out a load shifting in the pre-shift group with a starting clutch closed, coupling the internal combustion engine to the input shaft of the range-change transmission, and for engaging the pre-shift group and the main transmission, decreasing a load on a shift element in the pre-shift group by reducing the drive moment provided by the internal combustion engine and a drive moment provided by the electric motor, subsequently disengaging the shift element, synchronizing and subsequently engaging another shift element of the pre-shift group through adjustment of the drive moments provided by the internal combustion engine and the electric motor while maintaining a pulling force at the drive axle.

9. The method as in claim 5, further comprising for synchronization of the main transmission in connection with execution of a shift under an interrupted pulling force in the main transmission with the internal combustion engine coupled to the input shaft of the range-change transmission and the pre-shift group in neutral, performing, using the electric motor, the synchronization.

10. The method as in claim 5, further comprising for synchronization of the main transmission in connection with execution of a shift under an interrupted pulling force in the main transmission with the internal combustion engine coupled to the input shaft of the range-change transmission and the pre-shift group engaged, performing, using the electric motor, the synchronization with the internal combustion engine remaining coupled or decoupled from the input shaft of the range-change transmission.

11. A method for operating a motor vehicle having an automated range-change transmission and a hybrid drive unit with an internal combustion engine and an electric motor, the automated range-change transmission having:
    a main transmission with a main shaft and at least one lay shaft;
    a pre-shift group drivingly connected upstream of the main transmission, the pre-shift group configured as a split group;
    an input shaft configured for coupling to the internal combustion engine;
    an output shaft configured for coupling with a drive axle of the motor vehicle;
    a planetary transmission for coupling the electric motor to the pre-shift group, the planetary transmission having:
    a first element coupling the electric motor to the planetary transmission;
    a second element coupled to an input shaft of the pre-shift group, whereas the input shaft of the pre-shift group couples to the input shaft of the range-change transmission; and
    a third element coupled with an output shaft of the pre-shift group, the output shaft of the pre-shift group couples to the lay shaft of the main transmission;
    the method comprising:
    decoupling the internal combustion engine from the input shaft of the range-change transmission for pure electric driving of the motor vehicle by engaging the pre-shift group and the main transmission;
    operating the pre-shift group in a high gear ratio step and the main transmission in a first gear;
    for electrodynamic driving or starting the motor vehicle with the internal combustion engine coupled to the input shaft of the range-change transmission, operating the pre-shift group in neutral and engaging a gear in the main transmission, and for providing a drive moment, supporting, by the electric motor, the drive moment the internal combustion engine provides; and
    for providing additional traction power, bringing a starting clutch between the internal combustion engine and the input shaft of the range-change transmission into slip, synchronizing the pre-shift group, and engaging the pre-shift group in order to start through the internal combustion engine and the starting clutch.

12. The method as in claim 11, further comprising for transition from starting through the internal combustion engine and the starting clutch to electrodynamic starting, decreasing a load on a shift element in the pre-shift group by reducing the drive moment provided by the internal combustion engine and a drive moment provided by the electric motor, subsequently disengaging the shift element, adjusting the drive moment the electric motor provides, and synchronizing and closing the starting clutch.

13. A method for operating a motor vehicle having an automated range-change transmission and a hybrid drive unit with an internal combustion engine and an electric motor, the automated range-change transmission having:
    a main transmission with a main shaft and at least one lay shaft;
    a pre-shift group drivingly connected upstream of the main transmission, the pre-shift group configured as a split group;
    an input shaft configured for coupling to the internal combustion engine;
    an output shaft configured for coupling with a drive axle of the motor vehicle;
    a planetary transmission for coupling the electric motor to the pre-shift group, the planetary transmission having:
    a first element coupling the electric motor to the planetary transmission, the first element being a sun gear;
    a second element coupled to an input shaft of the pre-shift group, whereas the input shaft of the pre-shift group couples to the input shaft of the range-change transmission, the second element being a ring gear; and
    a third element coupled with an output shaft of the pre-shift group, the output shaft of the pre-shift group couples to the lay shaft of the main transmission, the third element being a planetary carrier;
    the method comprising:
    decoupling the internal combustion engine from the input shaft of the range-change transmission for pure electric driving of the motor vehicle by engaging the pre-shift group and the main transmission;
    operating the pre-shift group in a high gear ratio step and the main transmission in a first gear;
    wherein the range-change transmission further comprises:
    a first shift packet through which the second element of the planetary transmission is coupled with the input shaft of the range-change transmission in a first shift position of the first shift packet,
    a second shift packet through which the third element of the planetary transmission is coupled with the output shaft of the pre-shift group in a first shift position of the second shift packet, or
    a third shift packet through which the first element of the planetary transmission is coupled with the electric motor in a first shift position of the third shift packet;
    the method further comprising:
    for switching a respective one of the shift packets under load while engaging the pre-shift group, reducing a load at the electric motor by absorption of a load with the internal combustion engine so as to make a shift element to be disengaged in the respective shift packet load-free;
    subsequently disengaging the shift element; and
    synchronizing and subsequently engaging another shift element to be engaged in the respective shift packet by rotational speed control of the electric motor.

* * * * *